United States Patent [19]
Register et al.

[11] Patent Number: 6,049,647
[45] Date of Patent: Apr. 11, 2000

[54] COMPOSITE FIBER OPTIC CABLE

[75] Inventors: James A. Register, Hickory; Samuel D. Navé, Conover; James B. Dameron, Icard; Donald K. Hall, Mooresville; Louis A. Barrett, Conover, all of N.C.

[73] Assignee: Siecor Operations, LLC, Hickory, N.C.

[21] Appl. No.: 09/258,436

[22] Filed: Feb. 26, 1999

Related U.S. Application Data

[63] Continuation-in-part of application No. 08/931,634, Sep. 16, 1997, Pat. No. 5,917,977.

[51] Int. Cl.$^7$ ..................................................... G02B 6/44
[52] U.S. Cl. ........................... 385/101; 385/100; 385/106; 385/107; 385/110
[58] Field of Search ........................... 385/101, 100–114; 174/121 A

[56] References Cited

U.S. PATENT DOCUMENTS

| | | | |
|---|---|---|---|
| 4,731,504 | 3/1988 | Achille et al. | 174/107 |
| 5,268,971 | 12/1993 | Nilsson et al. | 385/101 |
| 5,373,100 | 12/1994 | Arroyo et al. | 174/23 R |
| 5,418,878 | 5/1995 | Sass et al. | 385/101 |
| 5,469,523 | 11/1995 | Blew et al. | 385/101 |
| 5,481,635 | 1/1996 | Arroyo et al. | 385/103 |
| 5,539,851 | 7/1996 | Taylor et al. | 385/101 |
| 5,544,270 | 8/1996 | Clark et al. | 385/101 |
| 5,557,698 | 9/1996 | Gareis et al. | 385/101 |
| 5,621,841 | 4/1997 | Field | 385/113 |
| 5,740,295 | 4/1998 | Kinard et al. | 385/109 |
| 5,852,698 | 12/1998 | Bringuier | 385/113 |
| 5,898,133 | 4/1999 | Bleich et al. | 174/121 A |
| 5,917,977 | 6/1999 | Barrett | 385/101 |

*Primary Examiner*—Phan T. H. Palmer
*Attorney, Agent, or Firm*—Timothy J. Aberle

[57] ABSTRACT

A composite cable for use in indoor or indoor/outdoor applications having a fiber optic core section includes at least one optical fiber. The composite cable includes a conductor and water blocking section, the conductor and water blocking section having a set of conductors providing mechanical strength and flame inhibiting characteristics to the composite cable. At least one interstice of the composite cable includes a water blocking member therein. An armor layer surrounds the conductor and water blocking section, and the armor layer is surrounded by a cable jacket with an interfacial zone defined therebetween. The interfacial zone includes a controlled bond layer so that during flame tests, as the jacket burns and forms a char barrier around the tape layer, the controlled bond layer supports the char barrier relative to the armor tape, thereby protecting the tape from flames and inhibiting the propagation of flame along the cable.

37 Claims, 1 Drawing Sheet

COMPOSITE FIBER OPTIC CABLE

RELATED APPLICATIONS

The present invention is a Continuation-in-Part of U.S. Ser. No. 08/931,634, filed Sep. 16, 1997, now U.S. Pat. No. 5,917,977, issued Jun. 29, 1999 which is hereby incorporated by reference herein.

The present invention relates to a composite cable that combines the high bit-rate capacity of optical fiber conductors with the power/data transmitting capacity of electrical conductors, and meets flame, mechanical, and environmental cable performance standards allowing the cable to be used for indoor or indoor/outdoor applications.

BACKGROUND OF THE INVENTION

Conventional fiber optic cables comprise optical fibers that are used to transmit voice, video, and data information. Fiber optic cables may be required to meet mechanical and environmental tests, for example, as defined in Bellcore GR-409-Core, Issue 1, published May, 1994, and incorporated by reference herein. The mechanical tests of Bellcore GR-409-Core include, for example, tensile strength, compression resistance, cycle flex, and impact tests. In addition, the mechanical tests of Bellcore GR-409-Core include, for example, temperature cycling and cable aging. Fiber optic cables not able to withstand the rigors of the foregoing tests may be rejected by customers for certain applications. An example of a fiber optic cable that meets Bellcore GR-409-Core is disclosed in U.S. Pat. No. 5627932 assigned to the assignee hereof. In addition, fiber optic cables may be required to meet Bellcore GR-20-Core, which sets forth water penetration standards for optical cables intended for outdoor applications.

Indoor fiber optic cables have been developed for installation in plenums and risers, and/or ducts of buildings. In order for a fiber optic cable to be rated for riser or plenum use, the cable must meet flame retardance standards as determined by means of vertical or horizontal flame tests. Exemplary requirements for such tests have been established by Underwriters Laboratories (UL). Since riser cables are typically installed in vertical shafts, the relevant standard for riser rated fiber optic cables is embodied in UL 1666, a flame test in a vertical shaft without a forced air draft in the shaft. UL 1666 does not include a smoke evolution requirement. UL has promulgated the riser rating requirements in a document entitled "Test for Flame Propagation Height of Electrical and Optical-Fiber Cables Installed Vertically in Shafts", wherein values for flame propagation height are set forth. Examples of riser rated fiber optic cables are disclosed in U.S. Pat. No. 5748823 and EP-A1-0410621.

The relevant standard for plenum rated fiber optic cables is embodied in UL 910, a horizontal flame test setting forth flame propagation and smoke evolution requirements. In the construction of many buildings, a plenum can include, for example, a space between a drop ceiling and a structural floor above the drop ceiling. A plenum typically serves as a conduit for forced air in an air handling system, and the plenum is oftentimes a convenient location for the installation of fiber optic cables. If, in the event of a fire, the fire reaches the plenum area, flames that would otherwise rapidly propagate along non-plenum rated cables are retarded by plenum rated cables. Moreover, plenum rated cables are designed to evolve limited amounts of smoke. Riser rated cables tested to UL 1666 specifications typically do not exhibit acceptable flame spread and smoke evolution results and may be therefore unsuitable for plenum use.

The UL 910 test is promulgated by UL in a document entitled: "Test for Flame Propagation and Smoke-Density Values for Electrical and Optical-Fiber Cables Used in Spaces Transporting Environmental Air". A key feature of the UL 910 test is the Steiner Tunnel test (horizontal forced air draft) as modified for communications cables. During the UL 910 test, flame spread values are observed for a predetermined time (20 minutes under the current standard), and smoke is measured by a photocell in an exhaust duct. Data from the photocell measurements are used to calculate peak and average optical density values. Specifically, according to UL 910, the measured flame spread must not exceed five feet, peak smoke (optical) density must not exceed 0.5, and average smoke (optical) density must not exceed 0.15. In general, for UL 1666, the measured flame spread must not exceed 12 ft. or 850° F.

In order to meet the foregoing standards, various cable materials used in riser or plenum cables for the prevention, inhibition, and/or extinguishment of flame, may fall into two general categories. The first category includes inherently non-flammable, flame-resistant materials that are thermally stable, and may have high decomposition temperatures, for example, certain metals or high temperature rated plastics. The materials included in this first category can be useful as thermal/heat/flame barriers. Thermal/heat/flame barriers may have disadvantages, however, as they can be generally expensive and, because of limited burn-performance characteristics, they may be limited to a narrow range of applications.

The second general category of materials used for the prevention, inhibition, and/or extinguishment of flame includes inherently flammable materials that have been chemically altered to include flame retardant additives. Such additives actively interfere with the chemical reactions associated with combustion. Examples of inherently flammable materials are polyethylene, polypropylene, polystyrene, polyesters, polyurethanes, and epoxy resins. Typical flame retardant additives include aluminum trihydrate, metal hydroxides, brominated and chlorinated organic compounds, and phosphate compounds.

By comparison, thermal/heat/flame barriers typically do not include flame retardant additives, but rather are relied upon in flame protection designs for their resistance to decomposition at high temperatures, or their inherent heat dissipation properties. An example of a fiber optic cable that requires a thermal barrier, and is designed for use in plenum applications, is disclosed in U.S. Pat. No. 4941729, and is incorporated by reference herein.

Exemplary known composite cables may not meet flame, water penetration, mechanical, and/or environmental cable performance standards, and may not be suitable for all indoor or indoor/outdoor applications. For example, U.S. Pat. No. 5544270 discloses a composite cable having multiple twisted pairs of electrical conductors in combination with optical fiber conductors. The cable has interstices between the twisted pair conductors and optical fiber conductors and, as none of the interstices include water blocking components, the cable may not meet water penetration standards.

Another composite cable that may not be suitable for all indoor or indoor/outdoor applications is disclosed in U.S. Pat. No. 5539851. The cable includes a single central, tight buffered optical fiber surrounded by a ring of electrical conductors and a braided sheath RFI shield. The optical fiber is immediately surrounded by a KEVLAR sleeve and a TEFLON jacket. Because the composite cable has a single fiber, it has limited information carrying capacity. Additionally, the composite cable does not provide water blocking features in the interstices adjacent to the electrical conductors. Moreover, the combination of a KEVLAR sleeve, TEFLON jacket, a ring of electrical conductors, and a braided sheath results in a large, stiff composite cable that is not particularly suited to being routed through cable passageways.

A cable that may be suitable for use in indoor applications is disclosed in U.S. Pat. No. 5481635. The cable includes a single large, central broadband coaxial cable, a set of voice-line twisted pair conductors, and a set of power conductors disposed around the coaxial conductor. Water blocking members are disposed about the coaxial cable. Compared to a fiber optic core, however, a coaxial core is disadvantageous because it has a smaller bandwidth capacity, and is subject to higher power loss. Moreover, the coaxial conductor is subject to electromagnetic interference, impedance, and electrical cross talk. Further, the coaxial conductor core is generally relatively heavier and larger, rendering it potentially difficult to route through cable passageways. Additionally, the coaxial conductor presents a spark hazard. Finally, because the coaxial conductor emits electromagnetic energy, it is easier to tap and is therefore less secure than a optical fiber core.

OBJECTS OF THE INVENTION

It is an object of the present invention to provide a low-cost composite cable that combines the high bit-rate capacity of optical fiber conductors with the power/data transmitting capacity of electrical conductors, and meets flame, water penetration, mechanical, and environmental cable performance standards allowing the cable to be used for indoor or indoor/outdoor applications.

It is another object of the invention to provide a composite cable for indoor use comprising: a fiber optic core section, said core section including at least one optical fiber; a set of conductors with interstices adjacent to at least some of said conductors; and a flame retardant jacket surrounding said conductors.

It is an object of the present invention to provide a composite cable for use in indoor/outdoor applications, comprising: a fiber optic core section, the core section including at least one optical fiber; a conductor and water blocking section, the conductor and water blocking section including a set of conductors providing mechanical strength characteristics to the composite cable, and a water blocking member therein; and an armor layer surrounding the conductor and water blocking section, the armor layer being surrounded by a cable jacket and defining an interfacial zone therebetween, the interfacial zone including a controlled bond layer so that, when the composite cable is subjected to flame tests, as the jacket burns and forms a char barrier around the tape layer, the controlled bond layer tends to support the char barrier relative to the armor tape, thereby protecting the tape from flames and inhibiting the propagation of flame along the cable.

It is an object of the present invention to provide a composite cable for use in indoor/outdoor applications, comprising a fiber optic core section, the core section including at least one optical fiber; a conductor and water blocking section, the conductor and water blocking section including a set of conductors with interstices adjacent to at least some of the conductors, water blocking members being generally in or adjacent to at least some of the interstices, and a separate water blocking member surrounding the set of conductors; and a flame retardant jacket surrounding the conductor and water blocking section.

It is an object of the present invention to provide a composite cable for use in indoor/outdoor applications, comprising a fiber optic core section, the core section including at least one optical fiber; a conductor and water blocking section, the conductor and water blocking section being multi-functional in that it contributes to flame, mechanical, and water penetration performance of the composite cable, the conductor and water blocking section including a set of conductors with interstices between at least some of the conductors, the conductors providing mechanical strength and flame inhibiting characteristics to the composite cable, with at least one of the interstices including a water blocking member therein, and a separate water blocking member surrounding the set of conductors.

It is an object of the present invention to provide a fiber optic conductor, comprising: an optical fiber surrounded by a buffer layer including an aliphatic polyketone polymer. The buffer layer can be, for example, a tight buffer layer or a buffer tube.

BRIEF DESCRIPTION OF THE DRAWING FIGURES

DETAILED DESCRIPTION OF THE INVENTION

Figure 1:
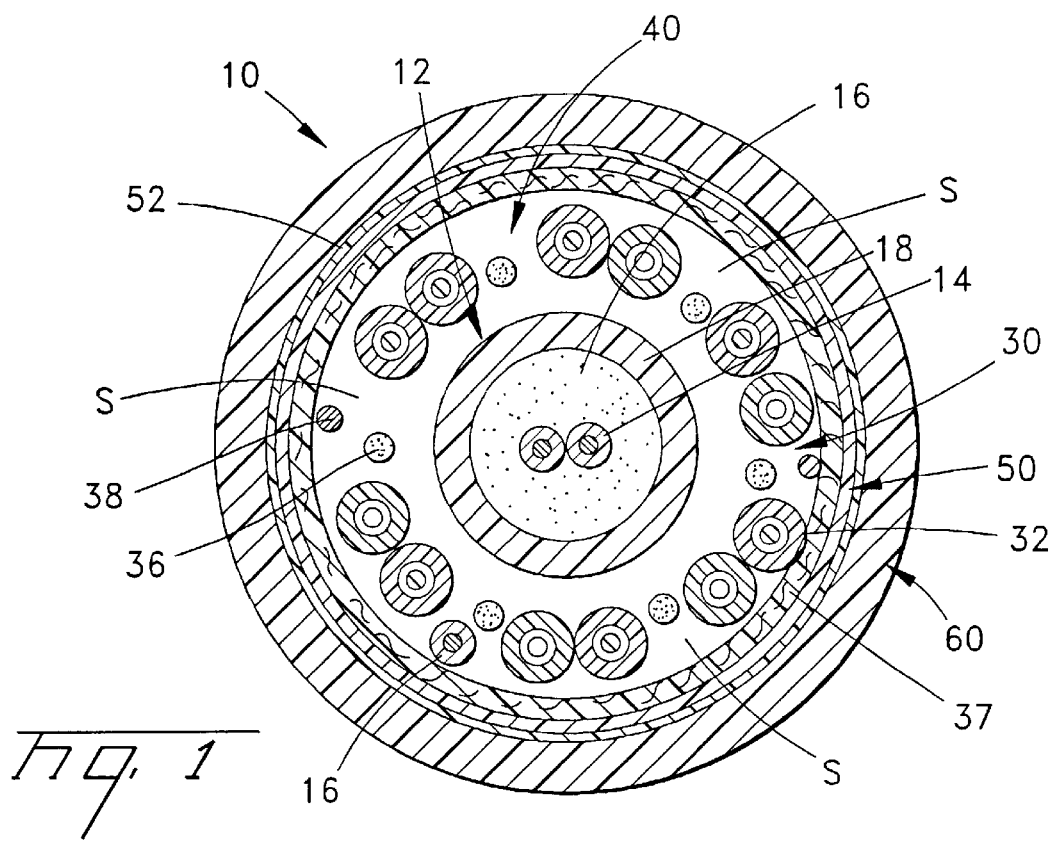
FIG. 1 is a cross sectional view of a composite cable according to an embodiment of the present invention.
Figure 2:
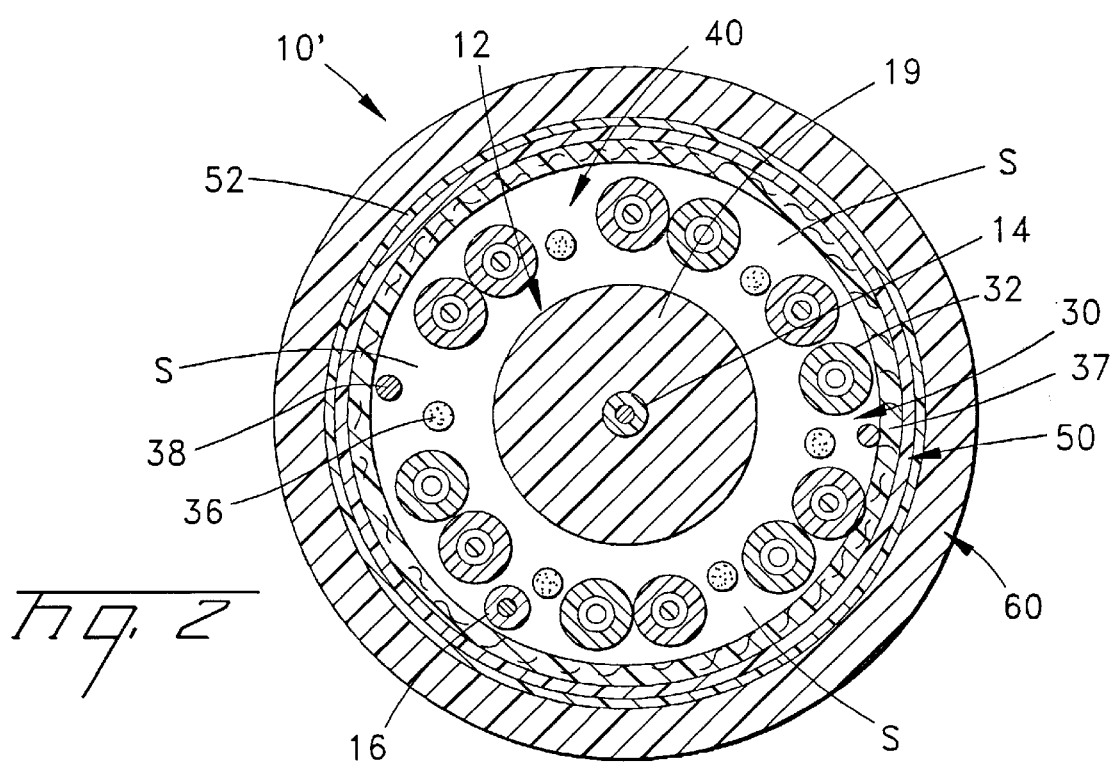
FIG. 2 is a cross sectional view of a composite cable according to a second embodiment of the present invention.

Referring to FIGS. 1–2, composite cables 10,10' according to the present invention will be described. Composite cables 10,10' combine the high bit-rate capacity of optical fiber conductors with the power/data transmitting capacity of electrical conductors, and meet flame, water penetration, mechanical, and environmental cable performance standards allowing the cables to be used for indoor or indoor/outdoor applications. Composite cables 10,10' can each include a core section 12, a conductor and water blocking section 30, an armor tape 50, and an outer jacket 60.

Referring to fiber optic cable 10 (FIG. 1), core section 12 includes at least one fiber optic conductor 14 surrounded by a buffer layer. The buffer layer can be a buffer tube 18 having a water blocking material 16 therein. Fiber optic conductor 14 may comprise, for example, one or more individual optical fibers, a group of optical fibers in a bundle, or one or more optical fiber ribbons. Core section 12 advantageously provides the high information carrying capacity of optical fibers to cable 10 without being subject to the disadvantages associated with electrical co-axial cables. Core section 12 is generally of a small size and has a light weight that facilitates routing of fiber optic cable 10 in cable passageways.

Material 16 can be a thixotropic water blocking material, e.g., a silicone or a petroleum-based material, that permits movement of fiber optic conductor 14 during bending, expansion or contraction of cable 10. Alternatively, buffer tube 18 may include a dry water blocking material therein, for example, water blocking tape or yarn, or hydrophilic or superabsorbent powder loosely dispersed or impregnated in tube 18.

For meeting plenum and/or riser flame tests, buffer tube 18 can be formed of an aliphatic polyketone polymer, used singly or in a polymer blend. Suitable aliphatic polyketone polymer compositions are described in U.S. Ser. No. 09/086, 876, incorporated by reference herein. Halogenated and/or non-halogenated flame retardant additives may be added to the buffer layer material. As an alternative to the loose tube configuration of buffer tube 18, the buffer layer can be a tight buffer layer 19, having one or more optical fibers therein, as embodied by fiber optic cable 10' (FIG. 2). Tight buffer layer 19 may comprise an aliphatic polyketone polymer used singly or blends thereof. In addition to flame test performance characteristics, the aliphatic polyketone polymer and blends thereof can be particularly advantageous in maintaining structural integrity of the buffer layer during high temperature connectorization processes.

The conductor and water blocking section 30 of cables made in accordance with the present invention is multi-functional in that it contributes to the flame, mechanical, and water penetration performance of the cable. Conductor and water blocking section 30 includes a set of conductors, for example, twisted pair conductors 32 for electrical power, control, and/or data transmission. For flame retardance, conductors 32 can include an aliphatic polyketone insulating material surrounding a metallic conductor preferably in the range of AWG sizes 19 to 22, inclusive. Conductors 32 can be stranded with an SZ or a counter-helical lay with respect to a center of the cable. Alternatively, conductors 32 can be disposed longitudinally with respect to the center of the cable. Although cables made in accordance with the present invention may include conventional strength members, this expense can be avoided, as the mechanical characteristics of conductors 32 impart sufficient tensile and crush strength to the cable thereby obviating the need for conventional strength members. More specifically, conductors 32 provide tensile strength, and buffer tube protection for meeting mechanical performance requirements of Bellcore GR-409-Core. In addition, conductor and water blocking section 30 may include one or more buffered optical fibers 16.

Water blocking is a feature of indoor/outdoor cables made according to the present invention, but is not required for indoor applications. As shown in FIGS. 1–2, conductors 32 are located in an annulus 40 defined between armor tape 50 and core section 12. Conductors 32 can be tightly or loosely placed adjacent to each other (as shown in the Figures), thereby forming interstices S of various sizes. Interstices S are simply any potential water penetration path between the cable components located within annulus 40. To meet GR-20-Core water penetration requirements for outdoor applications, distinct water blocking members are provided in conductor and water blocking section 30, for example, one or more water blocking yarns 36 are generally disposed in or adjacent to interstices S. For ease of manufacturing, water blocking yarns 36 can be stranded with conductors 32.

A second water blocking member, for example, a water blocking tape 37, can be disposed inside armor tape 50 adjacent to interstices S. Water blocking tape 37 can be longitudinally wrapped about conductor and water blocking section 30 whereby respective conductors 32 are generally disposed between respective water blocking yarns 36 and water blocking tape 37. Alternatively, tape 37 may be helically wrapped about twisted pair conductors 32. As is conventional in the art, tape 37 may be wrapped with binders (not shown), and ripcords 38 can be provided for stripping jacket 60 and armor tape 50.

Moreover, the interface between armor tape 50 and outer jacket 60 can present a potential water penetration path, and can present mechanical and/or flame performance issues. Armor tape 50 comprises a metallic material, for example, a corrugated steel tape material, that is adequate to provide a ground path in the event of an electrical short. Jacket 60 is preferably formed of a robust flame retardant material, for example, an aliphatic polyketone composition, a flame retarded PE, or a PVC having a Limiting Oxygen Index (LOI) above about 40, preferably about 52 for plenum applications and about 30 or above for riser applications. In one aspect of the present invention, an interfacial zone is defined at the interface of armor tape 50 and jacket 60. The interfacial zone includes a controlled bond layer 52. Layer 52 is preferably formed of a polymeric compound that creates a bond between jacket 60 and tape 50 as jacket 60 is extruded thereover. Pressure extrusion is the preferred mode of cable jacket extrusion. The controlled bond permits stripping of jacket 60, but the adhesion provided by layer 52 between jacket 60 and tape 50 is mechanically robust enough to withstand cable flex tests, thereby inhibiting the formation of potential leak paths, armor tape cracking, and jacket zippering. In addition, controlled bond layer 52 is believed to enhance performance of cables 10,10' in flame tests. For example, although all cable components are evaluated for their respective impacts on flame test performance, the material of jacket 60 and adherence thereof to layer 52 are believed to be effective in avoiding flame propagation in both UL 910 (plenum) and UL 1666 (riser) flame tests. Layer 52 may also reduce smoke evolution in plenum flame tests. During flame tests, as jacket 60 burns and forms a char barrier around tape 50, controlled bond layer 52 is believed to structurally support the coupled relationship between the char barrier and tape 50, thereby protecting the tape from heat/flames and inhibiting the propagation of flame along the cable. Layer 52 may also seal the armor seam thereby preventing the evolution of smoke from the cable core.

The present invention has thus been described with reference to the foregoing embodiments, which embodiments are intended to be illustrative of the inventive concepts rather than limiting. Persons of skill in the art will appreciate that variations and modifications of the foregoing embodiments may be made without departing from the scope of the appended claims. Cables 10,10' made in accordance with the present invention can be adapted for indoor use (riser or plenum) in which case the need for waterblocking tape 37 and/or yarns 36 is obviated. Cables 10,10' can include one or more tensile strength members, for example, of the dielectric type. Fiber optic conductor 14 can include one or more single mode, multi-mode, or multi-core optical fibers. Armor tape 50 can include a seam guard as disclosed in U.S. Ser. No. 09/001,679 U.S. Pat. No. 5,930,431, which is incorporated by reference herein. As an alternative to aliphatic polyketone polymers, buffer tube 18, tight buffer 19, and/or conductors 32 may comprise PVC blends, co-polyester elastomer, polyurethanes, a flouro compound, polyamide, or a PE material with or without the inclusion of flame retarding additives. Other alternative buffer materials may be, for example, polycarbonate, PBT, or polypropylene used singly, or in combination with the aforementioned aliphatic polyketone polymer. Buffer layers 18,19 can include various performance enhancing additives, for example, stabilizers. In addition, conductors 32 can include one or more electrical co-axial conductors. Rather than the preferred pressure extrusion technique mentioned above, jacket 60 may be tubed on. Armor tape 50 can include various metallic materials, e.g., laminated aluminum, copper clad steel, bronze tape, or a non-metallic tape that bonds sufficiently with the material of controlled bond layer 52. Furthermore, controlled bond layer 52 can include a multi-laminate structure, for example, as disclosed in U.S. Pat. No. 4731504, incorporated by reference herein.

Accordingly, what is claimed is:

1. A composite cable for use in indoor/outdoor applications, comprising:
    a fiber optic core section, said core section including at least one optical fiber;
    a conductor and water blocking section, said conductor and water blocking section including a set of conductors, said conductors providing mechanical strength characteristics to said composite cable, and a water blocking member; and
    an armor layer surrounding said conductor and water blocking section, said armor layer being surrounded by a cable jacket and defining an interfacial zone therebetween, said interfacial zone including a controlled bond layer so that, when said composite cable is subjected to flame tests, as said jacket burns and forms a char barrier around said tape layer, the controlled bond layer tends to support the char barrier relative to said armor tape, thereby inhibiting the propagation of flame along the cable.

2. The composite cable of claim 1, said controlled bond layer being operative to prevent the flow of water in said interfacial zone.

3. The composite cable of claim 1, said cable jacket having a LOI of about 40 or more.

4. The composite cable of claim 1, said cable jacket having a LOI of about 30 or more.

5. The composite cable of claim 1, said cable jacket being pressure extruded onto said controlled bond layer and thereby bonded thereto.

6. The composite cable of claim 1, said conductor and water blocking section including flame inhibiting characteristics.

7. A composite cable for use in indoor/outdoor applications, comprising:
    a fiber optic core section, said core section including at least one optical fiber;
    a conductor and water blocking section, said conductor and water blocking section including a set of conductors with interstices adjacent to at least some of said conductors, water blocking members being generally in or adjacent to at least some of said interstices, and a separate water blocking member surrounding said set of conductors; and
    a flame retardant jacket surrounding said conductor and water blocking section.

8. The composite cable of claim 7, said core section comprising a buffer tube with said at least one optical fiber located therein.

9. The composite cable of claim 8, said buffer tube comprising a flame retardant material.

10. The composite cable of claim 9, said flame retardant material comprising an aliphatic polyketone polymer.

11. The composite cable of claim 7, said at least one optical fiber being within a tight buffer layer.

12. The composite cable of claim 11, said tight buffer layer comprising a flame retardant material.

13. The composite cable of claim 12, said flame retardant material comprising an aliphatic polyketone polymer.

14. The composite cable of claim 7, at least one conductor of said set of conductors including an electrical conductor.

15. The composite cable of claim 14, said electrical conductor including a flame retardant insulating material.

16. The composite cable of claim 15, said flame retardant insulating material including an aliphatic polyketone polymer.

17. The composite cable of claim 7, said set of conductors including at least one twisted pair of electrical conductors.

18. The composite cable of claim 7, including an armor layer adjacent to said flame retardant cable jacket.

19. The composite cable of claim 18, including a controlled bond layer disposed between said cable jacket and said armor layer.

20. The composite cable of claim 7, said controlled bond layer couples said jacket to said armor layer so that when said composite cable is subjected to flame tests, as said jacket burns and forms a char barrier around said tape layer, the controlled bond layer tends to support the char barrier relative to said armor tape, thereby protecting the tape from flames and inhibiting the propagation of flame along the cable.

21. A composite cable for use in indoor applications, comprising:
    a fiber optic core section, said core section including at least one optical fiber;
    a set of conductors with interstices adjacent to at least some of said conductors; and
    a flame retardant cable jacket surrounding said conductors.

22. The composite cable of claim 21, including an armor layer adjacent to said flame retardant cable jacket.

23. The composite cable of claim 22, including a controlled bond layer disposed between said cable jacket and said armor layer.

24. The composite cable of claim 23, said controlled bond layer couples said jacket to said armor layer so that when said composite cable is subjected to flame tests, as said jacket burns and forms a char barrier around said tape layer, the controlled bond layer tends to support the char barrier relative to said armor tape, thereby protecting the tape from flames and inhibiting the propagation of flame along the cable.

25. The composite cable of claim 21, said at least one optical fiber being within a tight buffer layer.

26. The composite cable of claim 25, said tight buffer layer comprising a flame retardant material.

27. The composite cable of claim 26, said flame retardant material comprising an aliphatic polyketone polymer.

28. The composite cable of claim 21, said set of conductors including at least one twisted pair of electrical conductors.

29. The composite cable of claim 21, said core section comprising a buffer tube with said at least one optical fiber located therein.

30. The composite cable of claim 29, said buffer tube comprising a flame retardant material.

31. The composite cable of claim 30, said flame retardant material comprising an aliphatic polyketone polymer.

32. A composite cable for use in indoor/outdoor applications, comprising:

a fiber optic core section, said core section including at least one optical fiber;

a conductor and water blocking section, said conductor and water blocking section being multi-functional in that it contributes to mechanical and water penetration performance of said composite cable, said conductor and water blocking section including a set of conductors with interstices between at least some of said conductors, said conductors providing mechanical strength and flame inhibiting characteristics to said composite cable, with at least one of said interstices including a water blocking member generally in or adjacent thereto, and a separate water blocking member surrounding said set of conductors.

33. The composite cable of claim 32, said at least one optical fiber being located in a buffer material comprising an aliphatic polyketone polymer.

34. The composite cable of claim 32, said conductor and water blocking section including flame inhibiting characteristics.

35. A fiber optic conductor, comprising:

an optical fiber surrounded by a buffer layer including an aliphatic polyketone polymer.

36. The fiber optic conductor of claim 35, said buffer layer being a tight buffer layer.

37. The fiber optic conductor of claim 35, said buffer layer being a buffer tube.

* * * * *